Oct. 12, 1965 H. D. DORFMAN ETAL 3,211,960

INSULATING MOUNTING BLOCK AND CIRCUIT INTERRUPTING DEVICE

Filed Dec. 7, 1960 3 Sheets-Sheet 1

INSULATING MOUNTING BLOCK AND CIRCUIT INTERRUPTING DEVICE

Filed Dec. 7, 1960 3 Sheets-Sheet 2

Oct. 12, 1965 H. D. DORFMAN ETAL 3,211,960

INSULATING MOUNTING BLOCK AND CIRCUIT INTERRUPTING DEVICE

Filed Dec. 7, 1960 3 Sheets-Sheet 3

United States Patent Office 3,211,960
Patented Oct. 12, 1965

3,211,960

INSULATING MOUNTING BLOCK AND CIRCUIT INTERRUPTING DEVICE

Hiller D. Dorfman, deceased, late of Beaver, Pa., by Minnie R. Dorfman, administrator, Beaver, Pa., and Charles L. Jones, Beaver, Pa., assignors to Westinghouse Electric Corporation, East Pittsburgh, Pa., a corporation of Pennsylvania Filed Dec. 7, 1960, Ser. No. 74,436
12 Claims. (Cl. 317—119)

This invention relates, generally, to circuit interrupting devices and, more particularly, to insulating mounting blocks and means for mounting circuit interrupters on the mounting blocks.

One type of panelboard construction includes an insulating mounting block that is mounted over a plurality of multi-phase conductors or bus bars. The mounting block supports a plurality of conducting connectors that electrically connect the bus bars to one or more circuit breakers that are mounted on the mounting block. When two or more of these mounting blocks are disposed in a side-by-side relationship, each supporting one or more circuit breakers, the adjacent phase conductors must be adequately insulated from each other.

Accordingly, an object of the invention is to provide a circuit interrupting device constructed in such a manner that two similar devices can be mounted in an adequately insulated close side-by-side relationship.

Another object is to provide a circuit interrupting device comprising an insulating mounting block and a circuit breaker with improved means for mounting the circuit breaker on the mounting block.

Another object of the invention is to provide a circuit interrupting device comprising an insulating mounting block having a circuit breaker mounted thereon with improved means for insulating from each other the adjacent phase conductors within the interrupting device.

Another object of this invention is to provide a circuit interrupting device for interrupting a multi-phase circuit comprising a mounting block upon which is mounted a circuit breaker wherein the mounting block is disposed over a plurality of bus bars of different phases and it supports a plurality of electrical connectors that connect the bus bars to the circuit breaker, which device includes barrier means for insulating the adjacent phase conductors within the interrupting device from each other.

A further object of the invention is to provide an insulating mounting block structure having improved means for making either an end-type connection or a rear-type connection to the same electrical connector that is supported by the mounting block.

A still further object of the invention is to provide a circuit interrupting device comprising a mounting block and a circuit breaker with improved means for preventing mounting of the circuit breaker on the mounting block in the wrong position.

Other objects of the invention will be explained fully hereinafter or will be apparent to those skilled in the art.

In accordance with one embodiment of the invention, a mounting block molded of insulating material is provided having three slots in the rear thereof for receiving three bus bars of a multi-phase power distribution system. The bus bars and mounting block are mounted within a panelboard or control center in a suitable manner. Three elongated recesses are provided in the front of the mounting block for receiving three conducting connectors. An aperture in each of the recesses is disposed over a different one of the three bus bars. Each of the three conducting connectors is electrically connected to a different one of the bus bars. Each of the conducting connectors is electrically integral with two line stabs that extend upwardly in the mounting block near the center portion of the mounting block. Three load stab conductors are positioned at each of the two opposite ends of the mounting block to be connected to suitable load terminals.

Two multi-pole circuit breakers having clip-on type terminal connectors are mounted in an end-to-end relationship on the mounting block and each breaker clips onto three of the line stabs and three of the load stabs. Two barriers, molded integral with the circuit breaker housing at two opposite sides of the housing, overlap the sides of the mounting block. These barriers provide adequate insulation between the conductors of adjacent circuit interrupting devices when two or more similar circuit interrupting devices are mounted in a close side-by-side relationship.

The mounting block is provided with protrusions between adjacent conductors which protrusions fit into mating notches in the base of the circuit breaker housing to insulate the adjacent conductors within the interrupting device from each other. Each of the circuit breakers is mounted on the mounting block by means of four bolts that pass through four openings in the circuit breaker and into four openings in the mounting block. The bolts are threaded into four tapped members disposed in the mounting block openings. Protrusions molded integral with the circuit breaker housing adjacent the four bolt-holes serve as feet that are drawn toward the mounting block when the bolts are tightened to secure the circuit breaker in position. These feet are provided so that each circuit breaker is supported by means other than the insulating barriers and protrusions.

At each of the opposite ends of the mounting block, each of the load stab conductors is mounted in a separate cavity having an insulating knock-out portion at its base. The cavities and conductors are constructed such that either end-type terminal connectors or rear-type terminal connectors can be mounted in the cavities and connected to the same conductors supported within the cavities.

For a better understanding of the nature and objects of the invention, reference may be had to the following detailed description taken in conjunction with the accompanying drawings, in which.

Figure 1:
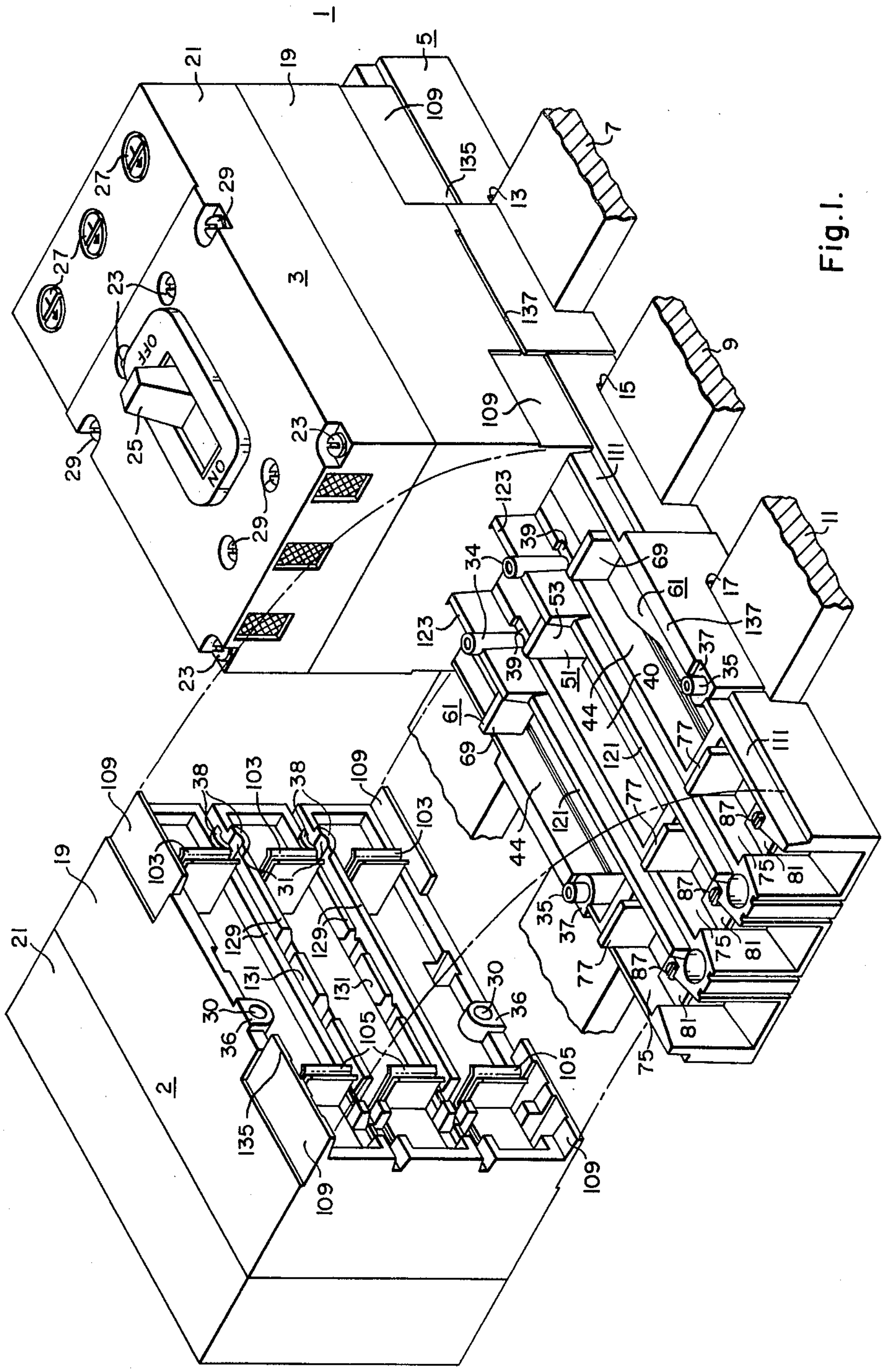
FIGURE 1 is an isometric view, on a reduced scale, of the circuit interrupting device of the invention.

Referring to the drawings, and more particularly to FIG. 1, there is shown therein a circuit interrupting device 1 comprising to two circuit breakers 2 and 3, a mounting block 5 of molded insulating material, and three bus bars 7, 9 and 11 of a multi-phase power distribution system. The mounting block 5 has three slots 13, 15 and 17 (FIGS. 1, 3 and 4) in the rear thereof for receiving the three bus bars 7, 9 and 11, respectively. These slots are provided in the rear of the mounting block for mounting the block upon the bus bars and for providing over-the-surface electrical clearance between adjacent bus bars. The bus bars and mounting block are mounted by means (not shown) in a panelboard or load center in a manner well known in the art.

Each of the circuit breakers 2 and 3 comprises a housing molded of insulating material which housing includes a base 19 and a cover 21 secured together by means of four mounting screws 23. An operating handle 25 of insulating material is provided for manually operating the circuit breaker to the on and the off positions in a manner well known in the art. The circuit breaker may be of the type shown, for example, in the patent to Dorfman No. 2,942,079 issued June 21, 1960. The circuit breaker includes three adjusting members 27 that are provided for adjusting the circuit breaker mechanism to automatically trip the breaker open upon the occurrence of an overload current condition above a predetermined value in any of the three pole units.

As seen in FIG. 1, the circuit breaker 2 is shown prior to its being mounted on the mounting block 5. The circuit breaker 3 is shown in position mounted on the mounting block 5. Each of the circuit breakers 2 and 3 is constructed to be mounted on the mounting block 5 by means of four mounting bolts 29 (see the circuit breaker 2) that extend through openings 30 and 31 (see the circuit breaker 1) in the circuit breaker base 19 and cover 21 and are screwed into tapped metallic inserts (not shown) that are disposed within holes 32 and 33 (FIG. 2) in the mounting block. Four insulating tubes 34 (FIGS. 1–4) are positioned in the four centrally disposed holes 32, and four shorter insulating tubes 35 (FIGS. 1 and 2) are positioned in the four outer holes 33. When, for example, the circuit breaker 2 (FIG. 1) is mounted on the mounting block 5, two of the insulating tubes 34 extend into the openings 31 and two of the insulating tubes 35 extend into the openings 30 in the circuit breaker housing. The tubes 34 and 35 insulate the mounting bolts 29 from the current carrying parts.

Each of the circuit breakers 2 and 3 has two flat faced projecting portions 36 (FIG. 1) adjacent the two mounting holes 30 that engage two flat faced depressed portions 37 adjacent the tubes 35 on the mounting block 5, and two sets of two annular flat faced projections 38 that engage flat-faced depressions 39 adjacent the tubes 34 on the mounting block when the circuit breakers are mounted in position. Each of the two flat faced projections 30 and each of the two sets of two annular shaped flat faced projections 38 serves as a foot so that each circuit breaker 1, 2 is essentially mounted on four feet each of which is adjacent one of the four mounting bolts 29. Thus, each of the circuit breakers 2 and 3 can be drawn down tightly against the mounting block 5 to be supported merely by the projections or feet 36 and 38. The advantages of this mounting arrangement will be hereinafter specifically described.

Figures 2, 3, 4:
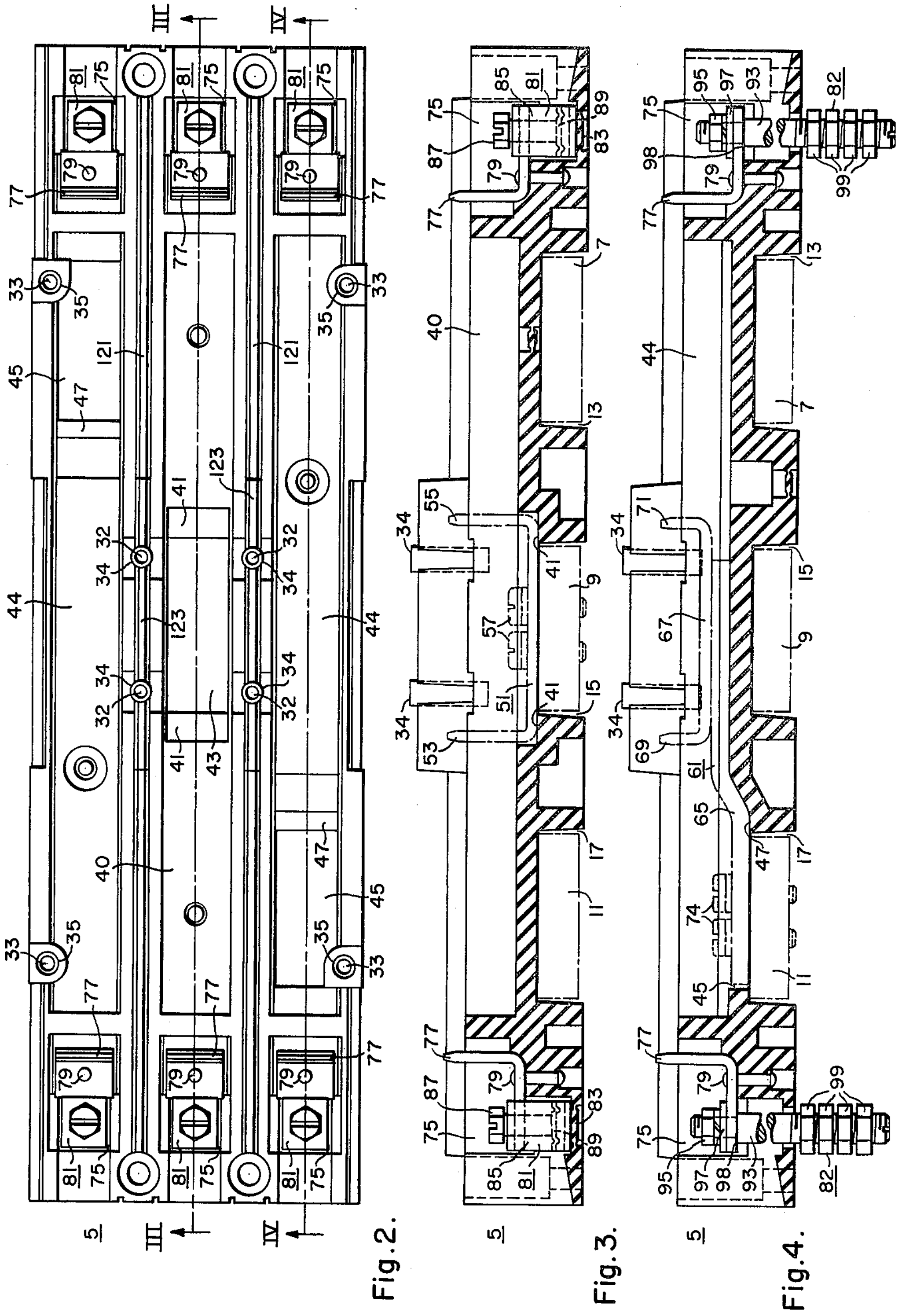
FIG. 2 is a plan view of the mounting block shown in FIG. 1, the connecting structures being omitted for the purpose of clarity.
FIG. 3 is a sectional view taken substantially along line III—III of FIG. 2; three bus bars and the connector for the center bus bar being shown in broken lines.
FIG. 4 is a view taken substantially along line IV—IV of FIG. 2 except that rear-type terminal connectors are shown rather than the end-type terminal connectors shown in FIGS. 1–3; the three bus bars and the connecting structures for the one outer bus bar being shown in broken lines.
Figure 6:
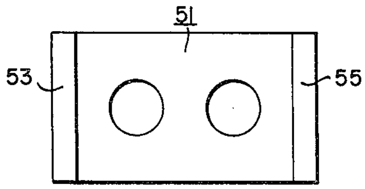
FIG. 6 is a top view of the connector shown in FIG. 5.
Figure 5:
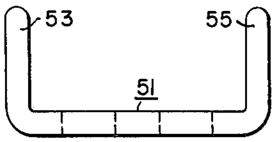
FIG. 5 is an elevational view of the connector for the center bus bar.
Figure 8:
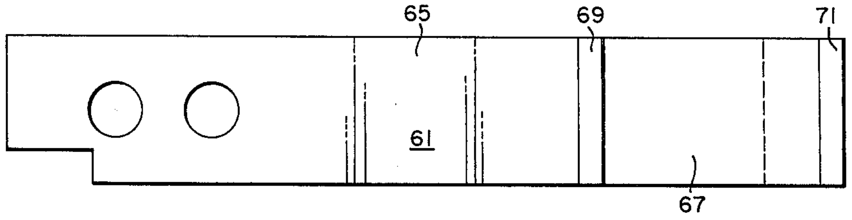
Figure 7:
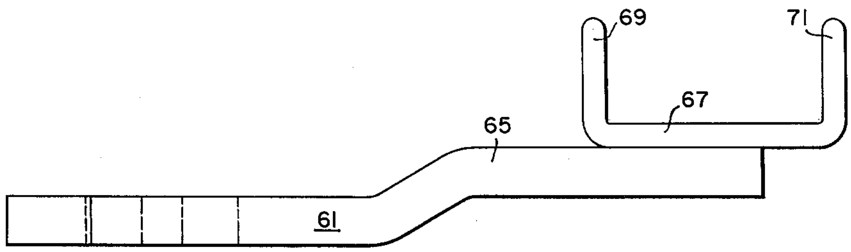
FIG. 7 is an elevational view of one of the connecting structures for the two outer bus bars; and, FIG. 8 is a top view of the connecting structure shown in FIG. 7.

A recess 40 (FIGS. 1–3) is provided in the center of the mounting block 5 having shoulder portions 41 on opposite sides of an aperture 43 which aperture is disposed in the recess 40 in the center part of the mounting block just over the bus bar 9 (FIG. 3). Two recesses 44 (FIGS. 1, 2 and 4) are provided on either side of the central recess 40. Each of the recesses 44 has an aperture 45 (FIGS. 2 and 4) therein near opposite ends of the mounting black 5 just over a different one of each of the two outer bus bars 11 and 7 (FIGS. 1 and 4). The recess 44 in which the aperture 45 is disposed over the bus bar 11 is shown clearly in FIG. 4. As seen in FIG. 2, the aperture 45 of the other outer recess 44 is disposed near the opposite end of the mounting block providing access to the other outer bus bar 7. A shoulder portion 47 is provided adjacent each of the apertures 45.

As best seen in FIG. 3, a generally U-shaped conducting connector 51 (FIGS. 1, 3, 5 and 6), having two stab portions 53 and 55 at free ends, is secured to the center bus bar 9 by means of two screws 57. The two shoulders 41 (FIG. 3) prevent downward movement as seen in FIG. 3 of the U-shaped member 51 and bus bar 9, and the body (as seen in FIG. 4) of the mounting block engages the bus bar 9 to prevent upward movement of the U-shaped member 51 and bus bar 9 to thereby support the bus bar 9 and U-shaped member 51 in position.

Two conducting connectors indicated generally at 61 (FIGS. 1, 4, 7 and 8) are provided in each of the two outer recesses 44. Only the connector 61 in one of the outer recesses 44 is shown specifically in FIG. 4. The connector 61 comprises a strap portion 65 and a generally U-shaped portion 67 which is welded or otherwise suitably attached to the strap portion 65. The U-shaped portion 67 has two stabs 69 and 71 at its ends. As shown in FIG. 4, the connector 61 is disposed to rest on the base of the recess 44 and on the shoulder 47. One end of the conector 61 is positioned over the aperture 45 and is connected to the bus bar 11 by means of two screws 74. The other connector 61 is disposed in the other outer recess 44 in a similar manner except that it is connected to the bus bar 7 which is near the other end of the mounting block 5. As seen in FIGS. 1, 3 and 4, when the conducting connectors 51 and 61 are all in place, the stabs 53, 69 are lined up transversely with respect to the mounting block 5, and the stabs 55, 71 (FIGS. 3 and 4) are lined up transversely with respect to the mounting block 5.

Three cavities 75 are provided at each of the two opposite longitudinal ends of the mounting block 5. A generally L-shaped stab connector 77 (FIGS. 3 and 4) is secured by means of a rivet 79 in each of the cavities 75. The rivet 79 passes through one leg of the connector 77 which connector rests on a shoulder in the cavity 75.

Referring to FIGS. 1, 2 and 3, it will be seen that end-type terminal connectors indicated generally at 81 are provided in each of the cavities 75. A different type of terminal connector 82, known in the art as a rear-type terminal connector, is shown in FIG. 4 merely to illustrate the invention. It is to be understood that, when the interrupting device 1 is installed in a panelboard or a load center, all three of the cavities 75 at the same end of the mounting block 5 house either all end-type terminal connectors 81 or all rear-type terminal connectors 82. A knock-out portion 83 (FIG. 3) is provided in the base of each of the cavities 75 and is left in place when the end-type terminal connector 81 is positioned in the cavity. The end-type terminal connectors 81 are of a type well known in the art comprising a generally rectangular shaped tubular conducting member 85 that is open at both ends and a screw 87 that threads through a tapped opening in the top of the member 85 is rotatably secured to a non-rotatable plate 89 which plate rides up and down with the member 85 when the screw 87 is rotated, one leg of the conducting stab connector 77 extends into one end of the member 85 and has an opening therein through which the screw 87 passes. The conducting stab connector 77 is welded or otherwise suitably secured to the conducting member 85.

When the mounting block 5 is installed in a panelboard or a load center, each connector 77 is electrically connected to a conductor (not shown) that comes in through the end of the mounting block 5. Each of these conductors is positioned between the base part of one of the members 85 and the associated plate 89. The screws 87 are then rotated and the plates 89 ride down to effect pressure connections between the conductors and the members 85 to thereby electrically connect the conductors to the stab connectors 77 in a manner well known in the art.

In application, all three cavities 75 at the same end of the mounting block 5 house the same type of terminal connector. When the rear-type terminal connectors 82 (FIG. 4) are used, the insulating knock-outs 83 (FIG. 3) are removed and a rod member 93 of conducting material which is threaded at both ends, is positioned in each of the cavities 75. Each of the members 93 has its upper portion in the associated cavity 75 and its lower portion extending below the cavity. Each member 93 passes through the opening in the stab connector 77 and is secured at its upper end by means of a nut 95 that is threaded over the member 93 to a position where it engages a washer 97. The nut 95, in each case, is rotated to draw a shoulder portion 98 on the member 93 against one leg of the associated stab connector 77. A plurality of nuts 99, four in this instance, are threaded onto the lower end of each of the members 93. This type of terminal connector is used when it is desired to wire the circuit breaker from the rear, in which case a conductor (not shown) is placed between two (preferably the center two) nuts 99 which are then tightened together to electrically connect the line to the member 93. The two end nuts on each member 93 are then used as lock nuts to prevent movement of the two inner nuts 99 to thereby secure the connections in a manner well known in the art.

It can be understood that either the end-type terminal connectors 81 or the rear-type terminal connectors 82 can be mounted in the mounting block 5 and secured to the same stab connectors 77 that are permanently supported by the mounting block 5. Applicants' improved mounting block therefore has the advantage of being usable with either a rear-type or end-type line connection without requiring any change in the stab connectors 77 that are supported in the mounting block.

Referring now to FIG. 1, each of the circuit breakers 2 and 3 is provided with three clip-on type terminal connectors 103 (see the circuit breaker 2) at one end of the breaker and three similar clip-on type terminal connectors 105 at the other end of the circuit breaker. When, for example, the circuit breaker 2 is mounted in position on the mounting block 5, the multiphase circuit runs from the bus bars 7, 9 and 11 through the conducting connectors 61, 51 and 61 respectively, the stabs 69, 53 and 69 respectively, the circuit breaker clip-on connectors 103, the internal conducting parts of the circuit breaker, the clip-on type circuit breaker connectors 105, the L-shaped stab connectors 77, to the end-type terminal connectors 81 or rear-type terminal connectors 82 (FIG. 4). The circuit is interrupted by either manual movement of the handle 25 from the "on" to the "off" position, or by means in the breaker, well known in the art, that automatically opens the breaker upon the occurrence of an overload current above a predetermined value in any of the three pole units within the breaker. The circuit breaker 3, which operates in the same manner as the circuit breaker 2, is connected to the stabs 71, 55 and 71 near the center of the mounting block 5, and to the stab connectors 77 at the right side of the mounting block as viewed in FIGS. 1–4.

In panelboards or load centers, the interrupting devices 1 which include the mounting block 5 and circuit breakers 2 and 3, are often mounted in a close side-by-side relationship over the same bus bars 7, 9 and 11. When this is the case, the outer conducting connectors 61 and stab connectors 77 of adjacent interrupting devices 1, and also the outer clip-on type circuit breaker terminal connectors 103, 105, must be adequately insulated from each other. Overlapping barriers 109 are provided that overlap side portions 111 of the insulating mounting block 5 to provide insulation between the stab connectors 77 and conducting connectors 61 of adjacent units. Since each of the straps 65 of the conducting connectors 61 dips down at one end to be connected to the associated bus bar, there is sufficient electrical clearance in this area between adjacent connectors so that the barriers 109 need be disposed only near the ends of the circuit breaker as seen in FIG. 1.

Improved means are provided for insulating the adjacent conductors within each interrupting device 1 from each other. As can be seen in FIG. 1, two protrusions 121 are molded integral with the mounting block 5 and they extend between the adjacent or different phased conductors in the mounting block 5. These protrusions 121 are higher at 123. An opening is provided in each of the protrusions 123 for receiving one of the insulating tubes 34 that insulate the mounting bolts 29.

As can be seen in FIG. 1, protrusions 129 molded integral with the insulating base 19 of each of the circuit breakers 2 and 3, form notches 131 that receive the insulating mounting block protrusions or barriers 121, 123 when the breakers are mounted in position. The protrusions 129 and 121, along with the tubular members 34, overlap to insulate the adjacent or different phase conductors in the electrical device 1 from each other along substantially the entire length of the unit 1.

The barriers 109 on the circuit breakers 2 and 3, and the protrusions or barriers 121, 123 on the mounting block 5, are short enough so that they do not support the breakers in position. When the mounting bolts 29 are tightened, the flat faced projections 36, 38 on the circuit breakers 2 and 3 engage the flat faced depressions 37 and 39 on the mounting block 5 to serve essentially as four feet, each adjacent one of the four mounting bolts 29. These feet firmly support the breakers 2 and 3 without the aid of the barriers 109, 121, 123 to thereby prevent unnecessary strain on the relatively weak barriers. This means of mounting the circuit breakers also prevents the possibility of wedging the barriers 121, 123 in their respective notches 131, which wedging would make removal of the circuit breakers more difficult.

The barriers 109 at the "off" end of each of the circuit breakers 2 and 3, are longer, lengthwise with respect to the circuit breakers, than the barriers 109 at the "on" end of each of the breakers. These slightly longer barriers 109 serve as keying means preventing a workman from mounting the breakers in a turned-around position. It is important that the breakers be mounted in only the positions shown in FIG. 1 so that the separable contacts within the breakers will, in the circuit, be between the power supplying bus bars and the operating mechanism. Thus, the operating mechanism will be "dead" and not "live" when the contacts are open. This is a safety requirement to protect a person that is working with the operating mechanism when the breaker is open. If the breakers 2 and 3 would be turned around lengthwise 180° from the positions in which they are shown in FIG. 1, they could not be mounted on the mounting block 5 because the lower edges, at 135, of the longer outer barriers 109 would engage high parts 137 at opposite sides of the mounting block 5 to prevent the breakers from being lowered to mountable positions.

From the foregoing description, it will be understood that applicants have provided an improved circuit interrupting device which is adapted to be mounted next to a similar device in a close side-by-side relationship with the adjacent conductors of different interrupting devices being adequately insulated from each other. Moreover, the adjacent conductors within each of the interrupting devices are adequately insulated from each other. The mounting block is provided with stab terminal connectors of simple construction that are rigidly supported in cavities in the mounting block which cavities are so constructed as to permit the mounting of either end-type terminal connectors or rear-type terminal connectors to the same stab terminal connectors. Improved keying means are provided for preventing the breakers from being mounted on the mounting block in the wrong positions.

Since numerous changes may be made in the above-described construction, and different embodiments of the invention may be made without departing from the spirit and scope thereof, it is intended that all matter contained in the foregoing description or shown in the accompanying drawings shall be interpreted as illustrative and not in a limiting sense.

We claim as our invention:

1. A circuit interrupting device comprising, in combination, an insulating mounting block having a plurality of transversely extending slots in the back thereof for receiving a plurality of bus bars, the mounting block having a plurality of longitudinally extending recesses in the front thereof, a conducting connector supported in each of said recesses, each of said conducting connectors having a stab portion, means for electrically connecting said conducting connectors to said bus bars, said mounting block having a plurality of cavities therein, a load-connector having a stab portion supported in each of said cavities, a multi-pole circuit breaker comprising an insulating housing and a plurality of pole units within the housing, a plurality of clip-on type terminal connectors extending from the rear of said circuit breaker near opposite ends of said circuit breaker and each clipping on to one of said stab portions, insulating barriers molded integral with the circuit breaker housing near each end of the circuit breaker at the two opposite sides thereof, and each of said barriers overlapping a portion of one side of said insulating mounting block whereby when two or more of said interrupting devices are mounted in a close side-by-side relationship said barriers serve to insulate the clip-on connectors and stab portions of the adjacent interrupting devices from each other.

2. In combination, an insulating mounting block having a plurality of transversely extending slots in the back thereof for receiving a plurality of bus bars, the mounting block having a plurality of adjacent longitudinally extending recesses in the front thereof, a plurality of conducting connectors, each of said adjacent recesses receiving a different one of said conducting connectors, an aperture extending from each of said recesses to a different one of said slots permitting each of said conducting connectors to contact a different one of said bus bars, a multi-pole circuit breaker comprising an insulating housing, a plurality of pole units within the housing, means for mounting the circuit breaker on the mounting block, means for electrically connecting each of the pole units of the circuit breaker with a different one of the conducting connectors, and parts of said mounting block and circuit breaker housing intermeshing to form barriers between the adjacent conducting connectors when the circuit breaker is mounted on the mounting block.

3. In combination, an insulating mounting block having a plurality of transversely extending slots in the back thereof for receiving a plurality of bus bars, the mounting block having a plurality of adjacent longitudinally extending recesses in the front thereof, means in each of said adjacent recesses for supporting a conducting connector, an aperture extending from each of said recesses to a different one of said slots permitting each of said conducting connectors to contact a different one of said bus bars, a multi-pole circuit breaker comprising an insulating housing and a plurality of pole units within the housing, means for mounting the circuit breaker on the mounting block, means for electrically connecting each of the pole units of the circuit breaker with a different one of the conducting connectors, notches molded integral with the mounting block between adjacent recesses, protrusions molded integral with the circuit breaker housing between adjacent pole units, and each of said protrusions being disposed within one of said notches when said circuit breaker is mounted on said mounting block.

4. In combination, an insulating mounting block having a plurality of transversely extending slots in the back thereof, each of said slots being adapted to receive therein a different bus bar, the mounting block having a plurality of longitudinally extending adjacent recesses in the front thereof, a plurality of conducting connectors, each of said adjacent recesses receiving therein a different one of said conducting connectors, an aperture extending from each of said recesses to a different one of said slots permitting each of said conducting connectors to contact a different one of said bus bars, two multi-pole circuit breakers each comprising an insulating housing and a plurality of pole units within the housing, means for mounting said circuit breakers in an end-to-end relationship on the mounting block, means for connecting said circuit breakers to said conductors, notches molded integral with each of said circuit breaker housings, protrusions molded integral with said mounting block and being disposed within said notches when said circuit breakers are mounted on said mounting block to form insulating barriers between adjacent recesses, and said insulating barriers extending substantially the entire length of said mounting block.

5. A circuit interrupting device comprising, in combination, an insulating mounting block having a plurality of adjacent longitudinally extending recesses in the front thereof, a plurality of conducting connectors, each of said conducting connectors being supported in a different one of said recesses, a multi-pole circuit breaker mounted wholly on said mounting block and comprising an insulating housing and a plurality of pole units within the housing, means for electrically connecting each of the pole units of the circuit breaker with a different one of the conducting connectors, parts of the mounting block and circuit breaker housing intermeshing to form insulating barriers between the adjacent recesses, parts of the mounting block and circuit breaker housing overlapping at two opposite sides of the circuit interrupting device, and means independent of said intermeshing parts for supporting the circuit breaker on the mounting block.

6. A circuit interrupting device comprising, in combination, an insulating mounting block having a plurality of adjacent longitudinally extending recesses in the front thereof, a plurality of conducting connectors, each of said recesses receiving a different one of said conducting connectors, a multi-pole circuit breaker comprising an insulating housing and a plurality of pole units within the housing, means for mounting the circuit breaker wholly on the mounting block, means for electrically connecting each of the pole units of the circuit breaker with a different one of said conducting connectors, when said circuit breaker is mounted on said mounting block parts of said mounting block and said circuit breaker housing overlapping to form insulating barriers between the adjacent recesses, and opposing flat faced portions of surface area on said circuit breaker housing and said mounting block being adapted to engage each other to support said circuit breaker on said mounting block independently of said insulating barriers.

7. A circuit interrupting device comprising, in combination, an insulating mounting block having a plurality of slots in the back thereof for receiving a plurality of bus bars, said mounting block having a plurality of recesses at the front thereof, a plurality of conducting connecting means supported in said recesses, means for connecting said conducting connecting means with said bus bars, said mounting block having a plurality of cavities at the front thereof in proximity to one end of said mounting block, a plurality of load terminal connectors supported in said cavities, a circuit breaker comprising an insulating housing, a plurality of terminal connecting structures supported at each of the two opposite ends of said insulating housing, means for mounting said circuit breaker on said mounting block with the terminal connecting structures at one end of said housing being in plug-in engagement with said conducting connecting means and with the terminal connecting structures at the other end of said housing being in plug-in engagement with said load terminal connectors, said insulating housing and said insulating mounting block being constructed such that when said circuit breaker is in said mounted position on said mounting block parts of said insulating housing and said mounting block will overlap in proximity to both ends of said circuit breaker at one side of said circuit interrupting device whereby two of said circuit interrupting devices can be mounted in a close side-by-side relationship with the circuit breakers of the adjacent circuit interrupting devices substantially abutting each other and with said overlapping parts serving to insulate the plug-in engaging parts of the adjacent circuit interrupting devices from each other.

8. A circuit interrupting device comprising, in combination, an insulating mounting block having a plurality of slots in the back thereof for receiving a plurality of bus bars, said mounting block having a plurality of recesses at the front thereof, stab-type conducting connecting means supported in said recesses, means for connecting said stab-type conducting connecting means with said bus bars, said mounting block having a plurality of cavities at the front thereof in proximity to one end of said mounting block, a plurality of stab-type load terminal connectors supported in said cavities, a circuit breaker comprising an insulating housing, a plurality of clip-type terminal connectors supported at each of the two opposite ends of said insulating housing, means for mounting said circuit breaker on said mounting block with the clip-type terminal connectors at one end of said housing connected to said stab-type conducting connecting means and with the clip-type terminal connectors at the other end of said housing connected to said stab-type load terminal connectors, said insulating housing and said insulating mounting block being constructed such that when said circuit breaker is in said mounted position on said mounting block parts of said insulating housing and said mounting block will overlap in proximity to both ends of said circuit breaker at each of the two opposite sides of said circuit interrupting device whereby two of said circuit interrupting devices can be mounted in a close side-by-side relationship with the circuit breakers of the adjacent circuit interrupting devices substantially abutting each other and said overlapping parts serving to insulate the clip-and-stab current carrying connections of the adjacent circuit interrupting devices from each other.

9. A circuit interrupting device, comprising, in combination, an elongated insulating mounting block having a plurality of transversely extending slots in the back thereof for receiving a plurality of bus bars, said mounting block having a plurality of longitudinally extending recesses in the front thereof, a stab-type conducting connector supported in each of said recesses, means for electrically connecting said stab-type conducting connectors to said bus bars, each of said stab-type conducting connectors comprising two stab portions disposed in proximity to the center of said elongated mounting block, said elongated mounting block having a plurality of cavities at the front thereof at each of the two opposite ends thereof, a stab-type load terminal connector supported in each of said cavities, two circuit breakers, each of said circuit breakers comprising an insulating housing and a plurality of clip-type terminals at each of two opposite ends of said insulating housing, a first of said circuit breakers being mounted on said mounting block with each of the clip-type terminals at one end thereof being connected to a different one of said stab portions and with each of the clip-type terminals at the other end thereof being connected to a different one of said stab-type load terminal connectors, the second of said circuit breakers being mounted on said mounting block in a generally end-to-end relationship with said first circuit breaker and with each of the clip-type terminals at one end thereof being connected to a different one of said stab portions and with each of the clip-type terminals at the other end thereof being connected to a different one of said stab-type load terminal connectors, ports of each of the insulating housings of each of said two circuit breakers being in an overlapping relationship with said insulating mounting block at each of the two opposite ends of each of said circuit breakers and at each of the two opposite sides of said circuit interrupting device whereby when two of said circuit interrupting devices are mounted in a close side-by-side relationship said stab portions, said stab-type load terminal connectors and said clip-type terminals of adjacent circuit interrupting devices will be insulated from each other.

10. A circuit interrupting device according to claim 1 wherein said cavities are disposed at one end of said mounting block and wherein each of said cavities is open at one end and at the front of said mounting block, a knock-out portion of insulating material at the base of each of said load-connectors comprising a stab portion extending out toward the front of said mounting block and a connection portion extending generally normal to said stab portion, each of said connecting portions having an opening therein aligned axially with the knock-out portion in the associated cavity, and an end-type connecting structure supported in each of said cavities over the associated knock-out portion and comprising a screw-type member extending through the opening in the associated connecting portion which screw-type member is operable to effect an electric connection between the associated load-connector and a conducting line that may be brought into the associated cavity through the end opening of the associated cavity.

11. A circuit interrupting device according to claim 7 wherein each of said cavities is open at an end and at the front thereof, a knock-out portion of insulating material at the base of each of said cavities, each of said load terminal connectors comprising a stab part extending out of the front of said mounting block and a connecting part extending generally normal to said stab part, each of said connecting parts having an opening therein, a knock-out portion of insulating material at the base of each of said cavities aligned axially with the opening in the associated connecting part, and an end-type connecting structure supported in each of said cavities over the associated knock-out portion and comprising a screw-type member extending through the opening in the associated connecting part which screw-type member is operable to effect an electric connection between the associated load terminal connector and a conducting line that may be brought into the associated cavity through the end opening of the associated cavity.

12. A circuit interrupting device according to claim 9 wherein each of said cavities is opened at an end and at the front thereof, each of said stab-type load terminal connectors comprising a stab part extending out toward the front of said mounting block and a connecting part extending generally normal to the associated stab part, each of said connecting parts having an opening therein, a knock-out portion of insulating material at the base of each of said cavities in axial alignment with the opening in the associated connecting part, an end-type connecting structure supported in each of said cavities over the associated knock-out portion and comprising a screw-type member extending through the opening in the associated connecting part which screw-type member is operable to effect an electric connection between the associated load terminal connector and a conducting line that may be brought into the associated cavity through the end opening of the associated cavity.

References Cited by the Examiner

UNITED STATES PATENTS

| | | | |
|---|---|---|---|
| 1,845,517 | 2/32 | Pelton | 339—219 |
| 2,193,201 | 3/40 | Millermaster | 317—99 |
| 2,422,589 | 6/47 | Samzelius | 339—219 |
| 2,707,761 | 5/55 | Page | 317—119 |
| 2,737,613 | 3/56 | Morris | 317—119 |
| 2,739,272 | 3/56 | Norden | 317—119 |
| 2,863,969 | 12/58 | Edmunds | 200—168 |
| 2,869,042 | 1/59 | Veitch et al. | 317—119 |
| 2,916,721 | 12/59 | Adams | 317—99 |
| 2,928,998 | 3/60 | Brumfield | 317—119 |
| 2,986,676 | 5/61 | Edmunds | 317—119 |
| 3,005,934 | 10/61 | Vogelsberg | 317—119 |

JOHN F. BURNS, *Primary Examiner.*

SAMUEL BERNSTEIN, LARAMIE E. ASKIN, *Examiners.*